United States Patent [19]

Lewis

[11] Patent Number: 5,666,481

[45] Date of Patent: Sep. 9, 1997

[54] METHOD AND APPARATUS FOR RESOLVING FAULTS IN COMMUNICATIONS NETWORKS

[75] Inventor: Lundy Lewis, Mason, N.H.

[73] Assignee: Cabletron Systems, Inc., Rochester, N.H.

[21] Appl. No.: 23,972

[22] Filed: Feb. 26, 1993

[51] Int. Cl.$^6$ .............................. G06F 11/00; G01R 31/28
[52] U.S. Cl. .................................. 395/182.02; 395/182.13; 371/20.1
[58] Field of Search ............................ 371/29.1, 20.1, 371/30; 395/575, 600, 182.02, 182.13, 182.18, 183.01, 183.02, 650; 364/284.4, 285.1

[56] References Cited

U.S. PATENT DOCUMENTS

| | | | |
|---|---|---|---|
| 5,253,184 | 10/1993 | Kleinschnitz | 364/550 |
| 5,311,422 | 5/1994 | Loftin et al. | 364/401 |
| 5,317,725 | 5/1994 | Smith et al. | 395/575 |
| 5,333,314 | 7/1994 | Masai et al. | 395/600 |

FOREIGN PATENT DOCUMENTS

| | | | |
|---|---|---|---|
| A-0398380 | 11/1990 | European Pat. Off. | H04L 12/40 |
| 0 442 809 | 8/1991 | European Pat. Off. | |
| 0 508 571 | 10/1992 | European Pat. Off. | |

OTHER PUBLICATIONS

Cronk, R.N. et al. 1988. Rule–Based Expert Systems for Network Management and Operations: An Introduction. In *Expert Systems Application in Integrated Network Management*, ed. Eric C. Ericson, 94–104. Norwood, MA: Artech House, Inc., 1989; hereinafter cited parenthetically as *Expert Systems*.

Sutter M.T. et al. 1988. Designing Expert Systems for Real–Time Diagnosis of Self–Correcting Networks. (*Expert Systems* 109–117).

Fault Management Applications. (*Expert Systems* 235–239).

Pagurek B. et al. 1988. Knowledge Based Fault Location in a Data Communication Network. (*Expert Systems* 240–244).

(List continued on next page.)

*Primary Examiner*—Robert W. Beausoliel, Jr.
*Assistant Examiner*—Trinh L. Tu
*Attorney, Agent, or Firm*—Wolf, Greenfield & Sacks, P.C.

[57] ABSTRACT

An improved method and apparatus of resolving faults in a communications network. The preferred system uses a trouble ticket data structure to describe communications network faults. Completed trouble tickets are stored in a library and when an outstanding trouble ticket is received, the system uses at least one determinator to correlate the outstanding communications network fault to data fields in the set of data fields of the trouble ticket data structure to determine which completed trouble tickets in the library are relevant to the outstanding communications network fault. The system retrieves a set of completed trouble tickets from the library that are similar to the outstanding trouble ticket and uses at least a portion of the resolution from at least one completed trouble ticket to provide a resolution of the outstanding trouble ticket. The determinators may be macros, rules, a decision tree derived from an information theoretic induction algorithm and/or a neural network memory derived from a neural network learning algorithm. The system may adapt the resolution from a retrieved trouble ticket to provide the resolution using null adaptation, parameterized adaptation, abstraction/respecialization adaptation, or critic-based adaptation techniques.

24 Claims, 7 Drawing Sheets

OTHER PUBLICATIONS

Peacock D. et al. 1988. Big Brother: A Network Services Expert. (*Expert Systems* 245–250).

Marques, T.E. 1988. A Symptom–Driven Expert System for Isolating and Correcting Network Faults. (*Expert Systems* 251–258).

Mathonet R. et al. 1987. DANTES: An Expert System for Real–Time Network Troubleshooting. (*Expert Systems* 259–262).

Callahan, P.H. 1988. Expert Systems for AT&T Switched Network Maintenance. (*Expert Systems* 263–273).

Quinlan, J.R., Learning Efficient Classification Procedures and Their Application to Chess End Games. In *Machine Learning An Artificial Intelligence Approach*, ed. Ryzard S. Michalski, 463–481. Palo Alto) CA: Tioga Publishing Co., 1983.

Lewis, L. *A Review of Rule–Based Approaches to Network Management*, Cabletron Systems, Inc., Apr. 20, 1992.

Goyal, S.K.. Knowledge Technologies for Evolving Networks. In *Integrated Network Management, II*, ed. Iyengar Krishnan, 439–461. North–Holland: Elsevier Science Publishers B.V., 1991.

Nance, Barry, LAN Analyzers Move to AI. In *BYTE*, One Phoenix Mill Lane, Peterborough, NH 03458, Mar. 1992, pp. 287–290.

Slade, S. Case–Based Reasoning: A Research Paradigm. In *AI Magazine*, Spring 1991) pp. 42–55.

Simoudis, E. Using Case–Based Retrieval for Customer Technical Support. In *IEEE Expert*, Oct. 1992, pp. 7–12.

Rumelhart, D.E. Learning Internal Representations by Error Propagation. In *Parallel Distributed Processing Explorations in the Microstructure of Cognition*, ed. David E. Rumelhart, 319–362. Cambridge, MA: The MIT Press, 1986.

Product brochure, Remedy Corporation, 1965 Landings Drive, Mountain View, CA 94043.

C. C. Lee, Fuzzy Logic . . . Systems:Fuzzy Logic Controller–Part I/II pp. 404–435, IEEE Transactions On Systems, Man And Cybernetics, vol. 20 No. 2, Mar./Apr. 1990.

L. A. Zadeh, Outline Of A New Approach To The Analysis of Complex Systems And Decision Processes, 1972, pp. 106–146, Reprinted from IEEE Trans. Systems, Man, and Cybernetics, SMC–3(1973), pp.28–44.

E. Cox, Fuzzy Fundamentals, Advanced Technology/Circuits, Oct. 1992, pp. 58–61 w/cover, IEEE Spectrum.

D. G. Schwartz, et al, Fuzzy Logic Flowers In Japan, Applications/Control, Jul. 1992, pp. 32–35 w/cover, IEEE Spectrum.

D. I. Brubaker, Fuzzy–Logic Basics: Intuitive Rules Replace Complex Math, EDN–Design Feature, Jun. 18, 1992, pp. 111–126, EDN.

L. Lewis, "A Case–Based Reasoning Approach To The Management Of Faults In Communications Networks," The Ninth Conference On Artificial Intelligence For Applications, 1–5 Mar. 1993, Orlando, Florida, pp. 114–120, IEEE, New York.

L. Lewis et al., "Extending Trouble Ticket Systems To Fault Diagnostics," IEEE Network: The Magazine of Computer Communications, vol. 7, No. 6, Nov. 1993, New York, pages 44–51.

Y. Lirov et al., "Expert Maintenance Systems In Telecommunications," Globecom '90, IEEE Global Telecommunications Conference and Exhibition, 2–5 Dec. 1990, San Diego, California, vol. 2, pp. 1344–1350, IEEE, New York, XP221102.

T.E. Marques, "StarKeeper Network Troubleshooter: An Expert System Product," AT & T Technical Journal, vol. 67, No. 6, Nov. 1988, New York, pp. 137–154, XP212378.

International Search Report for PCT Application PCT/US94/10605 filed Sep. 20, 1994.

2nd International Workshop On Industrial Fuzzy Control and Intelligent Systems, 2 Dec. 1992, College Station, TX, US pp. 40–48, Chakraborty B. et al. "Fuzzy Technique in Network Management Expert System".

IEICE Transactions, vol. E74. No. 12, Dec. 1991, Tokyo JP pp. 4000–4005, Tanaka Y. et al. "Dynamic Routing by the Use of Hierarchical Fuzzy System".

Patent Abstracts of Japan, vol. 17, No. 202 (E–1353) Apr. 20, 1993, & JP–A–04 345 236 Omron Corp.

Patent Abstracts of Japan, vol. 17, No. 418 (E–1408) Aug. 4, 1993 & JP–A–05 083 268 Hitachi Eng., Co. Ltd.

IEE Spectrum, Oct. 1992, pp. 58–61, E. Cox "Fuzzy Fundamentals".

Fig. 3

| Label | Field | Value |
|---|---|---|
| 62A | Entry-ID | 0000000116 |
| 62B | Alarm ID | 57 |
| 62C | Alarm Date/Time | 07/24/92 08:51:07 |
| 62S | Condition | ○ Red ○ Orange ● Yellow |
| 62D | Device Name | Ethernet-Randy |
| 62E | Device Type | Ethernet |
| 62F | IP Address | |
| | Trouble | file_transfer_throughput=F |
| | Additional Data | network_load=20, collision_rate=15, deferment_rate=20, users=31 |
| | History of Trouble | |
| | Probable Cause | |
| | Resolution | |
| 62Q | Resolution Status | ○ Good ○ No Good ● In Progress |
| 62R | Ticket Status | ● New ○ Assigned ○ Rejected ○ Closed |
| 62G | Submitter | SPECTRUM |
| 62H | Create-date | 07/24/92 08:51:08 |
| 62T | Notify-method | ○ None ○ Notifier ● E-mail |
| 62U | Assigned-Priority | ○ Low ● Medium ○ High |
| 62I | Assigned-to | |
| 62J | Last-modified-by | SPECTRUM |
| 62K | Modified-date | 07/24/92 08:51:08 |

Fig.7

Given: A set of tickets $T = \{T_1, T_2, \ldots, T_n\}$ and a set of ticket fields $F = \{f_1, f_2, \ldots, f_n\}$ such that each ticket $T_i$ is of the form $\{V_i(f_1), V_i(f_2), \ldots, V_i(f_n), V_i(f_p), V_i(f_r)\}$ where $f_1, \ldots, f_n$ are background description fields, $f_p$ is a problem description field, $f_r$ is a resolution description field, and $V_i(f_n)$ is the value of field $f_n$ in ticket $T_i$.

A set of determinator/adaptation rules $D = \{D_1, D_2, \ldots, D_n\}$ such that each $D_i$ is of the form: If $V(f_p)$ then the set of relevant fields is $R = \{f_1, f_2, \ldots, f_m\}$ and $V(f_r) = f(V(f_1), V(f_2), \ldots, V(f_m))$, where $R \subseteq F$ and $V(f_r)$ is determined by some function $f$ over the values of the fields in R.

Acquire: Enter new trouble ticket $T_{n+1}$, where $V_{n+1}(f_r) = $ null

Retrieve: Select determinator $D_i$ for which $V(f_p) = \max V_{n+1}(f_p)$
Retrieve ticket $T_j$ from $T$ such that for each $f_i$ in R, $V_j(f_i) = \max V_{n+1}(f_i)$

Adapt: Set $V_{n+1}(f_r) = V(f_r)$

Propose: Display ticket $T_{a+1}$ with $V_{n+1}(f_r)$

Process: Set $T = \{T_1, T_2, \ldots, T_n, T_{n+1}\}$

Repeat until no other $D_i$ is applicable

METHOD AND APPARATUS FOR RESOLVING FAULTS IN COMMUNICATIONS NETWORKS

BACKGROUND OF THE INVENTION

1. Field of the Invention

The present invention relates generally to communications networks, and in particular to a method and apparatus for resolving faults in such networks. Within this disclosure, the term "communications network" is used to refer to any type of digital communications system, of which a computer-based, local area network or a computer-based, wide area network are examples.

2. Discussion of the Related Art

All communications networks experience faults during network operation. Faults, as used in this disclosure, may include a failure of hardware portions of the communications network, such as workstations or peripheral devices and failure of software portions of the network, such as software application programs and data management programs. In small stable homogeneous communications networks (i.e., those in which all of the equipment is provided by the same vendor and the network configuration does not change), management and repair of network faults is relatively straightforward. However, as a communications network becomes increasingly large and heterogeneous (i.e., those in which different types of equipment are connected together over large areas, such as an entire country), fault management becomes more difficult.

One of the ways to improve fault management in large communications networks is to use a so-called "trouble-ticketing" system. This system provides a number of tools that can be used by network users, administrators, and repair and maintenance personnel. The basic data structure, a "trouble ticket," has a number of fields in which a user can enter data describing the parameters of an observed network fault. A trouble ticket filled out by a user may then be transmitted by, for example, an electronic mail system to maintenance and repair personnel. A trouble ticket describing a current network fault that needs to be acted on is called an "outstanding trouble ticket". When the network fault has been corrected, the solution to the problem, typically called a "resolution" is entered into an appropriate data field in the trouble ticket. When a network fault has been resolved, the trouble ticket is said to be completed. The system provides for storage of completed trouble tickets in a memory and thus a library of such tickets is created, allowing users, administrators, and maintenance and repair personnel to refer to these stored completed trouble tickets for assistance in determining solutions to new network faults.

The trouble-ticketing system thus provides a convenient, structured way of managing fault resolution and for storing solutions to network faults in a manner that allows this stored body of knowledge to be accessed and applied to outstanding communications network faults. An example of a trouble-ticketing system is the ACTION REQUEST SYSTEM, developed by Remedy Corporation, Mountainview, Calif., and sold by Cabletron Systems, Inc., Rochester, N.H.

A structured trouble-ticketing system, however, does not provide a complete solution to the fault management problem. For time-critical network services, the downtime that elapses from the observation of a network fault, the submission of a trouble ticket, to the completion of the trouble ticket can be expensive. Downtime can be reduced by providing a communication link between a network fault detection system and a trouble-ticketing system. The communication link allows fault information collected by the fault detection system to be transmitted to the trouble-ticketing system in the form of an automatically-generated and filled out trouble ticket. The trouble-ticketing system then manages communication and workflow among the network administrator, support staff, and end-users, in the normal manner to resolve the outstanding trouble ticket.

Although this solution allows trouble tickets to reach the fault management system and appropriate maintenance and repair personnel more quickly, it does not reduce the time necessary to resolve an outstanding fault. A maintenance and repair person is still required to research and resolve the outstanding fault. This is not only time-consuming, but expensive as well.

To reduce the time in which faults are resolved, artificial intelligence systems may be used to assist in resolving the outstanding trouble ticket. In existing systems that make use of artificial intelligence in this manner, fault resolution expertise is represented using a rule-based reasoning (hereinafter RBR) method.

A typical RBR system includes a working memory, a rule-base, and a control procedure. The working memory typically contains a representation of characteristics of the network, including topological and state information. The rule-base represents knowledge about what operations should be performed when the network malfunctions. If the network enters an undesirable state, the control procedure selects those rules that are applicable to the current situation. Of the rules that are applicable, a predetermined control strategy selects a rule to be executed. A rule can perform tests on the network, query a database, provide commands to a network configuration management system, or invoke another expert system. Using results obtained after executing a rule, the system updates the working memory by asserting, modifying, or removing working memory elements. The RBR system continues in this cycle until a desirable state in the working memory representing a desirable state of the network is achieved. Examples of RBR systems for network management may be seen in *Expert Systems Applications in Integrated Network Management*, edited by E. Erickson, L. Ericson, D. Minoli and published by Archtech House, Inc., 1989.

Constructing an RBR fault resolution system requires defining a description language that appropriately and completely represents networking conditions (the "domain"), extracting expertise from persons with expertise in the network ("domain experts") and/or trouble-shooting documents, and representing the expertise in the RBR format. This procedure requires several iterations of a so-called "consult/implement/test" cycle in order to achieve a correct system. In the consult/implement/test cycle, an expert is interviewed to determine his or her fault resolution methodology, the methodology is implemented in a rule or rules that the system can process, and the rules are tested. If the conditions or domain in which the RBR system operates remains relatively stable, once a correct system is achieved, minimal maintenance is required. However, if the system is used to resolve faults in unpredictable or rapidly changing domains, two problems typically occur. First, the RBR system suffers from the problem of "brittleness". Brittleness means that the system fails when it is presented with a novel problem for which it has no applicable rules. A cause of system brittleness is that the system cannot adapt existing knowledge to a novel situation or cannot gain new information from novel experiences to apply in the future. The second problem is commonly known as a "knowledge acquisition bottleneck". The knowledge acquisition bottleneck occurs when a knowledge engineer tries to manually modify the rule-base by devising special rules and control procedures in order to deal with changes, new parameters, or other unforeseen situations. As a result of these modifications, the RBR system typically becomes unwieldy, unpredictable, and unmaintainable. Furthermore, if the domain in which the RBR system operates is a rapidly changing one, the system can become obsolete in a relatively short period of time.

Therefore, an object of the present invention is to provide a method and apparatus for resolving faults in communications networks that learns from prior fault resolution scenarios and offers solutions to novel network faults based on past resolution scenarios.

Another object of the present invention is to provide a method and apparatus that applies so-called case-base reasoning (hereinafter "CBR") to fault management and resolution in communications networks.

Still another object of the present invention is to provide a method and apparatus for automatically resolving faults in communications networks.

SUMMARY OF THE INVENTION

The present invention overcomes the disadvantages of the prior art by providing an improved method and apparatus for resolving faults in a communications network. The system broadly includes acquiring information about an outstanding communications network fault, retrieving from a database relevant, previously stored sets of data regarding prior communications network faults and resolutions of those prior communications network faults, and using at least a portion of at least one of the previously stored resolutions to provide a resolution of the outstanding communications network fault. More specifically, the system utilizes a trouble ticket data structure capable of describing information concerning a communications network fault and using the trouble ticket data structure to create a trouble ticket that describes a specific network fault, the trouble ticket having a set of data fields capable of storing information regarding the network fault and a data field capable of storing a resolution of the specific network fault. A trouble ticket library capable of storing at least one trouble ticket is provided. When an outstanding trouble ticket is received, the system uses at least one determinator to correlate the outstanding fault to data fields in the set of data fields of the trouble ticket data structure and retrieves at least one trouble ticket from the library that is similar to the outstanding trouble ticket as a function of the at least one determinator. The determinator is a mechanism that allows the system to focus on and retrieve relevant trouble tickets and reduces the likelihood of the system retrieving irrelevant trouble tickets. The determinator identifies and correlates network faults with data fields in the trouble ticket that store data representing network characteristics or operating parameters and that are relevant to determining a resolution of the network fault. Determinators may be described as macros, rules, a decision tree determined by an information theoretic induction algorithm and/or as a neural network memory determined by a neural network learning algorithm. Thereafter, the system uses at least a portion of the resolution from at least one stored ticket to provide a resolution of the outstanding ticket.

In one embodiment of the invention, the system adapts the resolution from at least one similar retrieved trouble ticket to provide a resolution of the outstanding trouble ticket using parameterized adaptation, abstraction/respecialization adaptation, and/or critic-based adaptation techniques. The system can receive and complete outstanding trouble tickets automatically or in conjunction with user input.

The features and advantages of the present invention will be more readily understood and apparent from the following detailed description of the invention, which should be read in conjunction with the accompanying drawings, and from the claims which are appended at the end of the detailed description.

BRIEF DESCRIPTION OF THE DRAWINGS

In the drawings, which are incorporated herein by reference and in which like elements have been given like reference characters.

FIG. 3 is an example of a trouble ticket to be processed by the system of FIG. 1;

FIG. 7 illustrates a pseudo-code model that may be used to implement the processing functions illustrated in FIGS. 4–6A.

DETAILED DESCRIPTION

For purposes of illustration only and not to limit generality, the present invention will now be explained with reference to its use in management and resolution of faults occurring in a typical computer-based local area network. However, one skilled in the art will recognize that the present invention is applicable to other types of communications networks.

Figure 1:
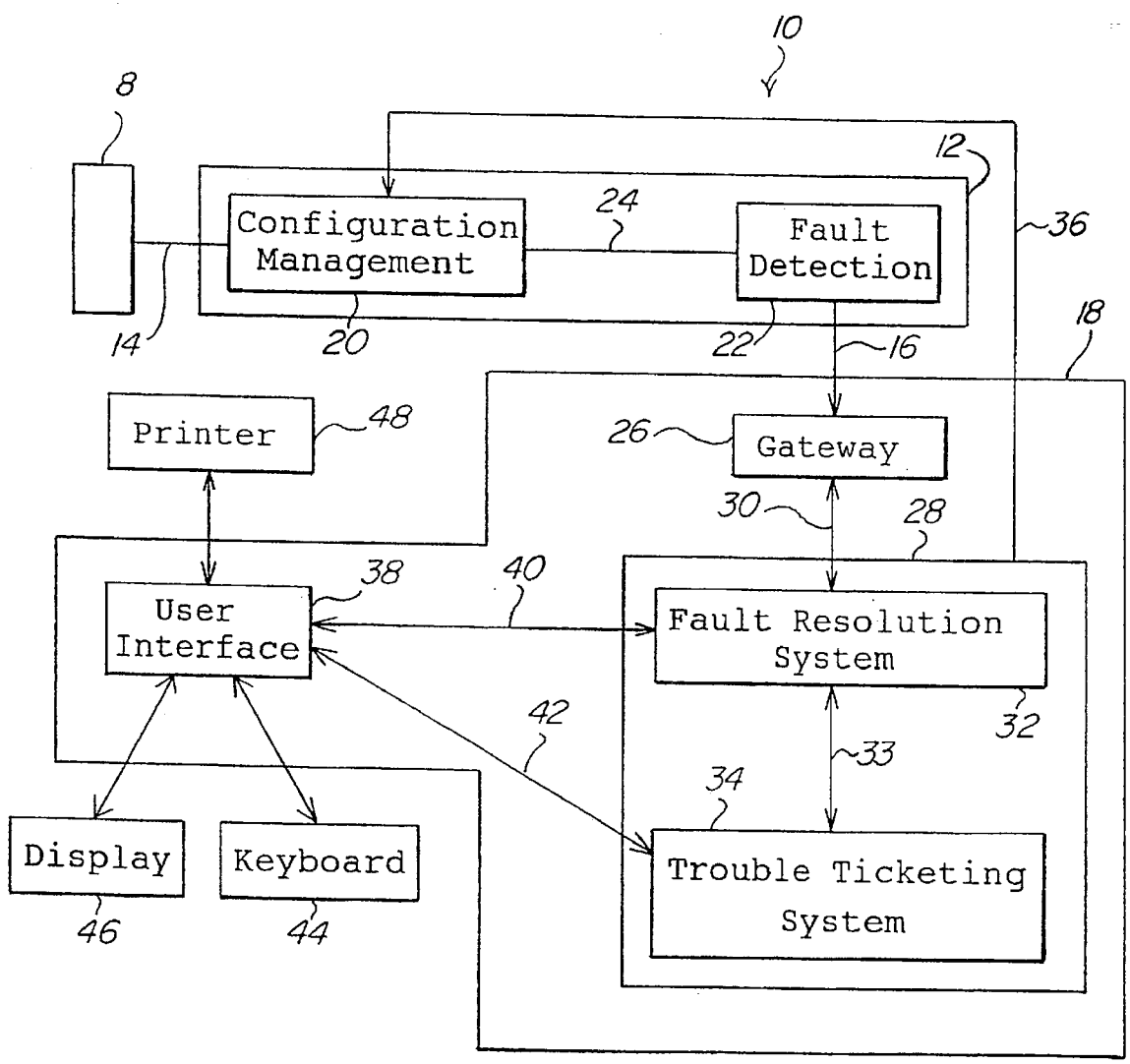
FIG. 1 is a block diagram of a fault management and resolution system of the present invention.

FIG. 1 is an overall block diagram of a fault management and resolution system 10 which incorporates the present invention. The system includes a network monitoring system 12 that is coupled via communications link 14 to a local area network 8. Network monitoring system 12 is coupled, via communication link 16 to fault processing system 18. By "communications link" is meant any type of software/hardware data transmission/reception medium.

Network monitoring system 12 may be the SPECTRUM™ local area network monitoring system manufactured by Cabletron Systems, Inc., Rochester, N.H. The SPECTRUM™ system is described in copending and commonly owned U.S. patent application Ser. No. 07/583,509 entitled NETWORK MANAGEMENT SYSTEM USING MODEL-BASED INTELLIGENCE filed Sep. 17, 1990; U.S. paten application Ser. No. 07/789,000 entitled NETWORK MANAGEMENT SYSTEM USING STATUS SUPPRESSION TO ISOLATE NETWORK FAULTS filed Nov. 7, 1991; U.S. Ser. No. 07/790,408 entitled NETWORK MANAGEMENT SYSTEM USING INTERCONNECTED HIERARCHIES TO REPRESENT DIFFERENT DIMENSIONS filed Nov. 7, 1991; U.S. patent application Ser. No.

07/788,936 entitled NETWORK MANAGEMENT SYSTEM USING MULTIFUNCTION ICONS filed Nov. 7, 1991; U.S. patent application Ser. No. 07/797,121 entitled METHOD AND APPARATUS FOR MONITORING THE STATUS OF NON-POLABLE DEVICES IN A COMPUTER NETWORK filed Nov. 22, 1991, which are hereby incorporated by reference in their entirety.

The network monitoring system 12 includes a configuration management module 20 and fault detection module 22. Configuration management module 20 provides for monitoring and control of certain aspects of network operation, such as uploading or downloading software, allocating memory, and network organization. Fault detection module 22 monitors local area network 8 via communications link 14, configuration management module 20 and communications link 24 to detect any undesirable network conditions that indicate a fault has occurred. If a network fault is detected, fault detection module 22 may automatically gather and transmit appropriate fault information via communications link 16 to fault processing system 18.

Fault processing system 18 includes a gateway or interface 26 that receives fault information from fault detection module 22 and applies any necessary communication protocol with the fault detection module 22 and automatically, in one embodiment of the invention, gateway 26 generates a trouble ticket that may be processed by fault management and resolution system 28. Gateway 26 may be the ARS GATEWAY manufactured by Cabletron Systems, Inc, Rochester, N.H. The so-processed trouble ticket is transmitted to fault management and resolution system 28 via communications link 30.

Fault management and resolution system 28 includes a fault resolution system 32 coupled to a fault management or trouble-ticketing system 34. Trouble-ticketing system 34 may be the aforementioned ACTION REQUEST SYSTEM. As will be explained in greater detail, fault resolution system 32 processes a received trouble ticket, retrieves relevant trouble tickets that may be useful in resolving the particular network fault from trouble-ticketing system 34, adapts (in one embodiment of the invention) resolutions from the retrieved trouble tickets to address the network fault of the outstanding trouble ticket, and processes the resolution automatically or under user control to correct the communications network fault. The fault resolution may be transmitted via communications link 36 to configuration management module 20, for use on network 8.

Fault processing system 18 also includes a user interface module 38 coupled to fault resolution system 32 via communications link 40 and trouble-ticketing system 34 via communications link 42. User interface module 38 allows a user to edit and control proposed fault resolutions generated by fault resolution system 32 using keyboard 44. Proposed resolutions and system status may be viewed by the user on display 46 or permanently recorded by printer 48.

The functions carried out by fault processing system 18 may be implemented by programming a general purpose computer as will be described in greater detail. The general purpose computer may be the network file server, a client workstation attached to the network, or a workstation dedicated to use by maintenance and repair personnel for network fault resolution.

Figure 2:
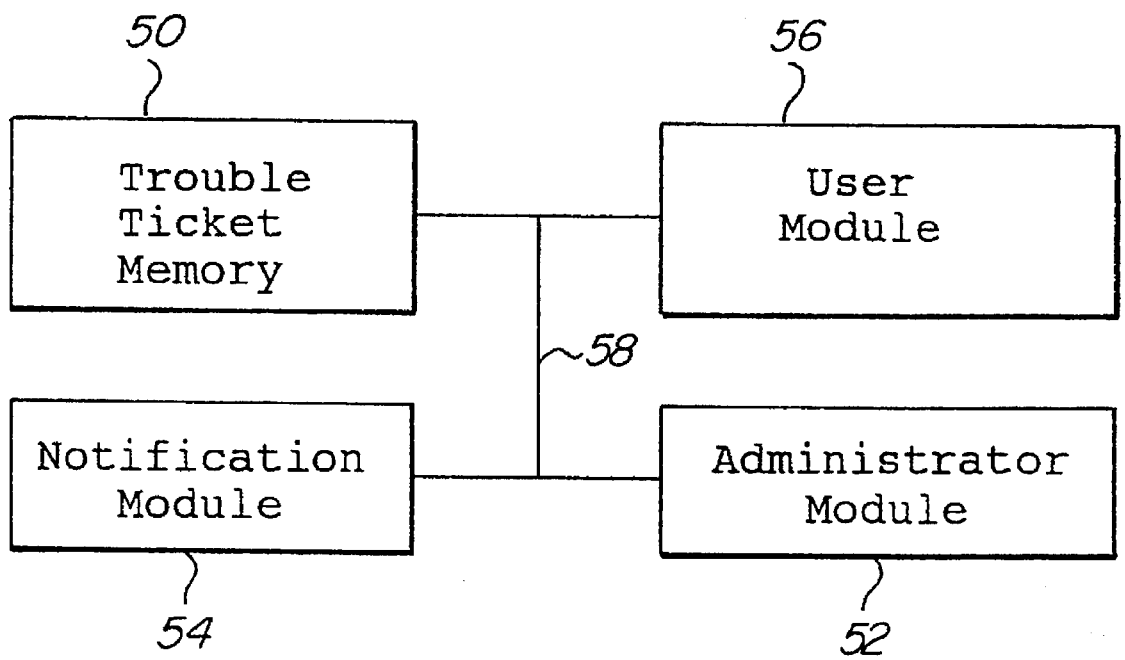
FIG. 2 is a block diagram of a trouble-ticketing system that may be used in the system of FIG. 1.

FIG. 2 is a block diagram of various modules included in trouble-ticketing system 34. A trouble ticket memory 50 is used to store completed trouble tickets and provides a library of fault resolution scenarios that may be called up by the fault resolution system 32 for dealing with an outstanding trouble ticket. An administrator module 52, allows the system administrator to configure the trouble ticket format for various system users. A notification module 54 provides automatic notification to a pre-selected maintenance and repair person upon receipt of a trouble ticket. A user module 56 allows a user to access trouble ticket memory 50 in order to view a trouble ticket and allows entry or modification of certain data in the trouble ticket such as repair status by authorized personnel. A communications link 58 connects the various modules together.

FIG. 3 illustrates the format of a typical trouble ticket automatically generated by gateway 26 to be processed by fault resolution system 32 and trouble-ticketing system 34. Trouble ticket 60 includes a plurality of fields 62A through 62R. These fields enable a user manually or network monitoring system 12 automatically to fill out the trouble ticket so that a maintenance and repair person may obtain the information necessary to resolve the problem. As noted, trouble ticket 60 was automatically generated by gateway 26 using data from network monitoring system 12 and therefore field 62G contains SPECTRUM™, the name of the network monitoring system as the submitter's name. The fault detection module 22 automatically provides the data such as the submitter's name, the creation date, the alarm condition, etc. for entry into the appropriate field of the trouble ticket. The particular network fault is entered into trouble field 62L and any additional data that may be helpful to the maintenance and repair personnel is entered in data field 62M. Field 62M may be subdivided into separate fields. Data for trouble ticket 60 is automatically transmitted from network monitoring system 12 to fault processing system 18 via communication link 16.

The present invention, in fault management and resolution system 28 applies so-called "case-based reasoning" to trouble ticket resolution. The case-based reasoning method of the invention represents fault resolution expertise in the form of cases, i.e., particular, specific, fault resolution scenarios stored in completed trouble tickets, rather than general rules as are used in existing RBR systems. The present invention recalls, adapts (in one embodiment), and executes these prior fault resolution scenarios stored in prior trouble tickets in an attempt to resolve an outstanding trouble ticket. When confronted with a novel problem, fault resolution system 32, using case-based reasoning, retrieves one or more similar trouble tickets from trouble-ticketing system 34 and tries to adapt the resolution of the prior trouble ticket in an attempt to resolve the outstanding network fault. Each stored trouble ticket represents a prior case of problem solving, and the entire trouble ticket database stored in memory module 50 represents a case library.

Figure 4:
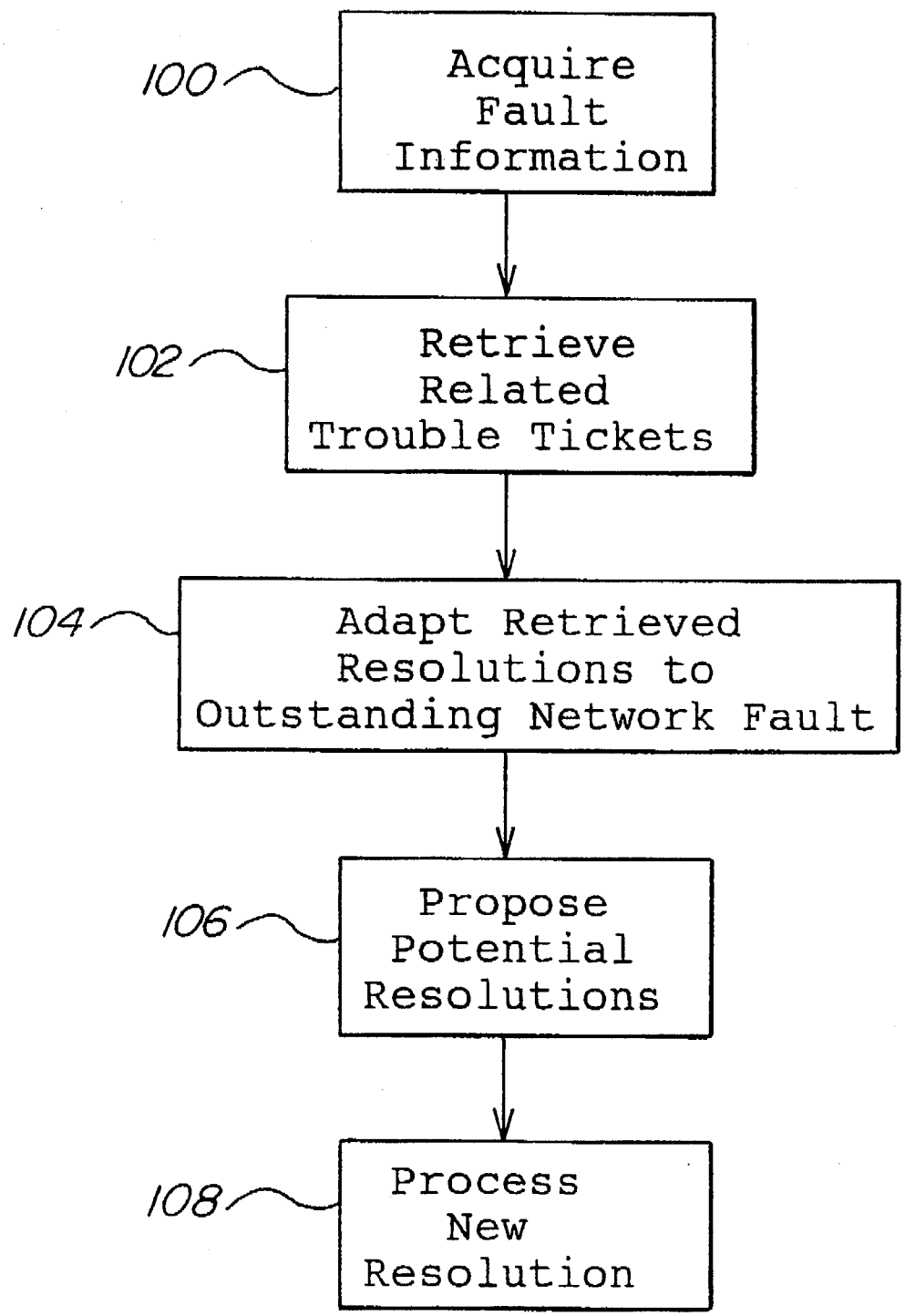
FIG. 4 is a flow chart illustrating the processing steps carried out by the fault management and resolution system of FIG. 1.

FIG. 4 illustrates the overall processing steps carried out by fault management and resolution system 28 when processing a trouble ticket 60. In step 100, the system receives a trouble ticket from gateway 26, or information indicative of a network fault from user interface 38. Once a trouble ticket has been received, the system proceeds to step 102 in which, as will be explained in greater detail, fault resolution system 32 accesses trouble-ticketing system 34 to retrieve one or more stored trouble tickets from memory 50 that are similar to outstanding trouble ticket 60. From step 102, the fault resolution system proceeds to step 104 wherein the system selects and examines the retrieved trouble ticket which is most similar to outstanding trouble ticket 60. If the retrieved ticket is a perfect match in all relevant fields, the resolution is not altered and the system proceeds directly to step 106. On the other hand, if the trouble ticket is not an exact match in all relevant fields, step 104 employs adaptation techniques, which will be described in more detail, to adapt the pre-existing resolutions to the present fault, and then proceeds to step 106.

In step 106, the system proposes potential solutions by displaying them on display monitor 46 or printing them on printer 48 to allow the maintenance and repair person to inspect, execute, and/or manually adapt the proposed solutions, if desired. The system may also test the potential resolutions in step 106 by transmitting them via communications link 36 to configuration management module 20 for execution by network control software. From step 106, the system proceeds to step 108 in which the new resolution correcting the network fault is processed. The resolution is entered into resolution field 62P of trouble ticket 60. Trouble ticket 60 is then stored in trouble ticket memory 50, thus adding to the system's knowledge base that may be accessed in order to resolve future communications network faults. In another embodiment, the resolution may be automatically transmitted via communication link 36 to configuration management module 20 to correct the outstanding network fault.

The system is capable of fully automatic operation and can receive relevant trouble tickets, process them, and correct network faults fully automatically without any user intervention.

Figure 5:
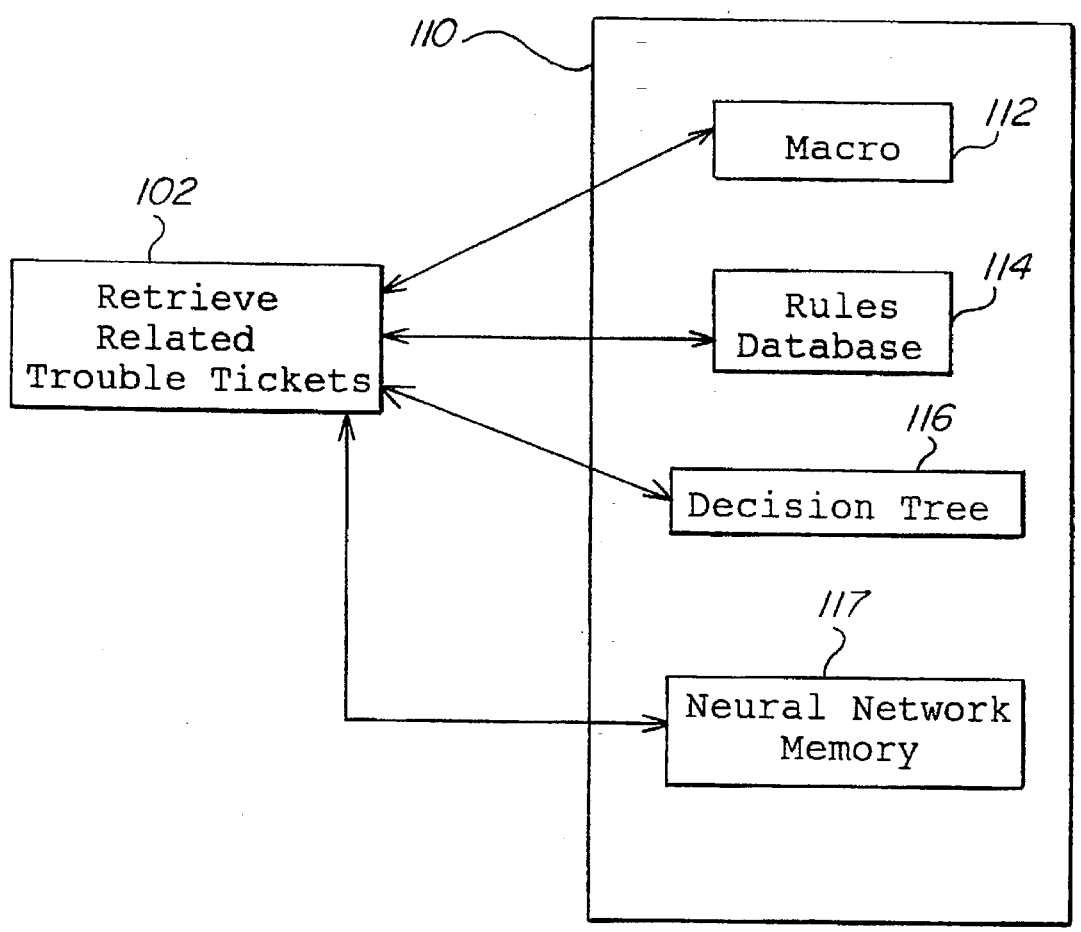
FIG. 5 is a flow chart illustrating the processing steps carried out by the retrieve module of FIG. 4.

FIG. 5 illustrates in more detail the operation of retrieve step 102. The usefulness of a trouble ticket retrieved from trouble ticket memory 50 depends upon the degree to which it is similar to outstanding ticket 60. Retrieve step 102 uses at least one set of determinators stored in determinator module 110 that includes relevance information defining relationships among classes of network faults and corresponding sets of trouble ticket data fields 62A–62R. A set of determinators includes at least one determinator. A determinator identifies relevant trouble ticket data fields for specific kinds of troubles. For a given network fault, a set of determinators identifies the relevant fields of a trouble ticket for a given network fault so that only trouble tickets that are useful in resolving the outstanding trouble ticket are retrieved from trouble ticket memory 50.

As an example, the network fault recorded in data field 62L of trouble ticket 60 is "file_transfer throughput=F". In order to select relevant trouble tickets from memory 50, the relevant data fields to be looked at are those that represent things such as bandwidth, network load, packet collision rate, and packet deferment rate. A determinator may thus be phrased as: "The solution to the trouble 'file transfer_throughput=F' is determined by looking at bandwidth, network load, packet collision rate, and packet deferment rate". A set of such determinators relating network faults to relevant data fields is provided and stored as data structures in module 110. When the system is processing an outstanding trouble ticket, it uses at least one of the sets of determinators stored in determinator module 110 and retrieves relevant trouble tickets from trouble ticket memory 50 as a function of the determinators.

FIG. 5 illustrates four different types of sets of determinators that may be stored in the system for use by retrieve step 102. Determinators may be stored as "macros" in macro data structure 112, "rules" in rules database data structure 114, as a decision tree in decision tree data structure 116, and/or as a neural network memory in neural network memory data structure 117. Macros may be determined by recording the actions of the repair and maintenance personnel during the sorting and selection of relevant trouble tickets and then defining the process as a series of steps that may be processed in step 102 when similar troubles arise in the future. The macro is a determinator that matches specific faults to trouble ticket data fields. Rules for rules database 114 may be determined by having domain experts explicitly specify a set of rules that match specific faults to trouble ticket data fields. Each rule is a determinator. Using knowledge engineering techniques such as the "consult/implement/test" technique previously described, these rules can be refined manually, automatically, or by a combination of automatic and manual modification as the system deals with network faults, and can change as the network changes. A decision tree may be determined by applying an information theoretic induction algorithm such as the "ID3" (Iterative Dichotomizing Third) algorithm to the trouble ticket database to provide a decision tree structure containing determinators that match specific faults to trouble ticket data fields. The "ID3" algorithm is described in "Learning Efficient Classification Procedures and their Applications to Chess End-Games" by J. R. Quinlan published in the book *Machine Learning: An Artificial Intelligence Approach*, pp. 463–482, 1983. A neural network memory may be determined by applying a neural network learning algorithm such as a "back-propagation" algorithm to the trouble ticket database to provide a neural network memory structure containing determinators that match specific faults to trouble ticket data fields. The "back-propagation" algorithm is described in "Learning Internal Representation by Error Propagation," by D. E. Rumelhart, G. E. Hinton, and R. J. Williams published in the book *Parallel Distributed Processing: Exploration in the Microstructure of Cognition*, MIT Press, 1986, pp. 318–362. These determinators may be used singularly or in combination in step 102 when selecting relevant trouble tickets.

Typically, when a group of trouble tickets has been retrieved, the tickets are indexed in order of increasing similarity to the outstanding network fault. The first so-indexed ticket is chosen and its resolution strategy is considered and/or executed by steps 104–108. If that resolution does not work, the next ticket is chosen and the process is repeated. An important feature of the present invention is that as each retrieved trouble ticket is processed by step 108, a new trouble ticket can be created that records the system's experience with a given network fault and a given resolution and that new ticket placed in memory 50 for future reference. For example, if the system executed a resolution to the outstanding trouble ticket and the resolution proved to be unsatisfactory, the system can copy trouble ticket 60 to generate a new trouble ticket, store the unsatisfactory resolution in resolution field 62P, and then indicate in field 62Q that the resolution was unsatisfactory by filling in status "No Good." This new trouble ticket is then stored in memory 50, thus increasing the system's knowledge base so that the system learns, over time, which resolutions work and which do not for a particular network fault.

Figure 6:
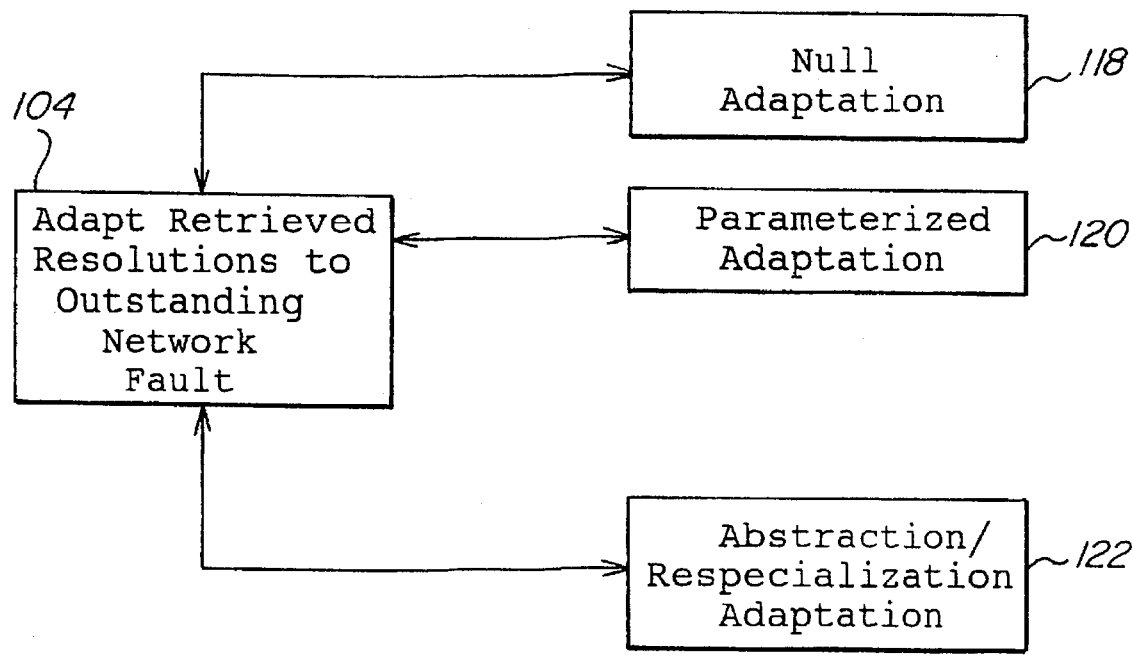
FIG. 6 is a flow chart illustrating the processing steps carried out by the adapt module of FIG. 4.

FIG. 6 illustrates in more detail the operation of adaptation step 104. In step 104, the resolution in a retrieved trouble ticket can be adapted to resolve the outstanding network fault if no trouble ticket is located in memory 50 having a perfect match between the network fault, the relevant data fields, and the proposed resolution. FIG. 6 illustrates three adaptation techniques that the system can use to modify the resolution of a retrieved trouble ticket for use with an outstanding trouble ticket. Adaptation step 104 can access a data structure 118 containing a null adaptation technique, a data structure 120 containing a parameterized adaptation technique, and/or a data structure 122 containing an abstraction/respecialization adaptation technique.

The null adaptation technique provided by module 118 means that no adaptation is performed and the resolution in the retrieved trouble ticket is simply passed from step 104 to step 106. The system may be programmed by a user to provide null adaptation through user interface 38. This technique allows the adaptation step to be bypassed and thereby allows the prior resolution to be filled in exactly in data field 62L.

The parameterized adaptation technique performed by module 120 is a method by which a solution variable in the representation of an outstanding network fault entered in data field 62L of an outstanding trouble ticket is adjusted relative to a problem variable in the representation of an outstanding network fault entered in data field 62L. The adjustment is based on the relationship between the solution and problem variables in the retrieved ticket. For example, assume that the network fault of a retrieved trouble ticket is "file_transfer_throughput=F" and the resolution of this fault is "A=f(F), adjust_network load=A". If the outstanding trouble ticket fault is "file_transfer_throughput=F'", then the parameterized adaptation module 120 may propose resolution "A'=f(F'), adjust_network_load=A'". Thus, parameterized adaptation module 120 chooses a resolution such that the relationship between F' and A' in the outstanding trouble ticket is the same as the relationship between F and A in the retrieved trouble ticket. Parameterized adaptation module 120 can provide the proposed resolution using a user-defined function that calculates A' for any values of F', a function expressed by a neural network on fuzzy logic-system that calculates A' for any values of F', a lookup table, where the value of A' is determined by interpolation over values of F', a sequence of steps that calculates A' for any values of F', or a decision tree that calculates A' for any values of F', The different types of parameterized adaptation steps may be used singularly or in combination.

The abstraction/respecialization technique provided by module 122 allows the system to consider viable alternative resolutions to a fault. If, for example, there is a prohibitive constraint on a proposed resolution, such as an unobtainable increase in bandwidth, the system abstracts over i.e., stops considering and processing the retrieved trouble ticket that contains the proposed resolution and respecializes to i.e., chooses another retrieved trouble ticket that contains an alternative solution. For example, suppose the network fault is "file transfer_throughput=F", and consider two retrieved tickets that are equally similar to the outstanding trouble ticket. The first ticket contains the following trouble (i.e., network fault) and resolution:

1) trouble: file_transfer_throughput=F additional data: none resolution: A=f(F), adjust_network_load=A resolution status: good The second trouble ticket contains the following trouble and resolution:

2) trouble: file_transfer_throughput=F additional data: none resolution: B=g(F), increase_bandwidth=B resolution status: good If there is a constraint on the possible resolution of the outstanding ticket such as a prohibition on the adjustment of network load or, if the execution of "adjust_network_load" does not resolve the trouble, the system would proceed from proposing the resolution of the first retrieved trouble ticket to proposing the resolution of "increase_bandwidth" of the second retrieved trouble ticket. A new trouble ticket is then created and stored in trouble ticket memory 50 containing the following information:

3) trouble: file_transfer_throughput=F additional data: adjust_network_load=no resolution: A=f(F), adjust_network_load=A resolution status: no good The system creates a new trouble ticket that may be stored in trouble ticket memory 50 containing the trouble, proposed resolution, and constraint for use in resolving future network faults, thus increasing the system's knowledge base.

Figure 6A:
FIG. 6A is a flow chart illustrating processing steps carried out by the propose module of FIG. 4.

FIG. 6A illustrates an additional adaptation technique provided by critic-base adaptation module 124. Critic-based adaptation module 124 allows a user, through user interface 38 to edit a proposed displayed potential solution presented by propose step 106 or to enter his or her own solution to the outstanding network fault. Critic-based adaptation is another form of adaptation that allows the system to adapt previous resolutions to novel network faults. Critic-based adaptation includes adding, removing, reordering, or replacing steps in the proposed retrieved solution. For example, considering the first retrieved trouble ticket described in connection with FIG. 6 above, a maintenance and repair person could include the data field "network load" and refine the solution by providing a two-place function f(F,N) that calculates the amount of adjustment based on the values of file "transfer_throughput" and "network load". The proposed resolution to the new trouble would be the following:

4) trouble: file_transfer_throughput=F additional data: network_load=N resolution: A=f(F,N), adjust_network_load=A resolution status: good This new trouble ticket is processed in step 108 and stored in trouble ticket memory 50. If the same network fault recurs and the value of network load is available, the system in step 104 could propose a value for A using the two-place function f(F,N). If the value of network load is unavailable, the value of A would be determined using the one place function f(F). Note also that parameterized adaptation of module 120 could be applied to this new trouble ticket for use in resolving a future network fault.

The system is capable of using null adaptation, parameterized adaptation, abstraction/respecialization, and critic-based adaptation singularly or in combination. The use of adaptation techniques allows the system to increase its knowledge base and learn from prior fault resolution scenarios in order to more efficiently deal with novel network faults.

FIG. 7 is a pseudo-code implementation of the processing steps illustrated in FIGS. 4–6A. FIG. 7 represents one pass through the system operation. FIG. 7 illustrates one determinator rule being selected and the use of parameterized adaptation to adapt the retrieved ticket. To enable the abstraction/respecialization adaptation technique and to be able to retrieve multiple tickets, the operations Retrieve, Adapt, and Propose are enclosed in a loop controlled by the command "Repeat until no other $D_i$ is applicable". To provide for critic-based adaptation, the Propose module would allow the user to overwrite $V_{n+1}(f_r)$. To disable the adaptation operation, the code in the Adapt module is replaced with Set $V_{n+1}(f_r)=V_i(f_r)$ in which case the solution in ticket $T_i$ is written directly to the outstanding ticket $T_{n+1}$ without alteration.

Having thus described one particular embodiment of the invention, various alterations, modifications, and improvements will readily occur to those skilled in the art. For example, one skilled in the art will recognize that the present invention is applicable to networks other than local area networks. In addition, the present invention can be used with communications networks fault management systems other than trouble ticket type systems, such as spread sheet systems or database systems. Such alterations, modifications, and improvements are intended to be part of this disclosure and are intended to be within the spirit and scope of the invention. Accordingly, the foregoing description is by way of example only and is not intended as limiting. The invention is limited only as defined in the following claims and equivalents thereto.

What is claimed is:

1. A case-based method of resolving faults in a communications network, comprising the steps of:
   (A) acquiring information about a current outstanding communications network fault;
   (B) defining at least one determinator to identify at least one data field within the acquired information about the current outstanding communications network fault, the at least one identified data field to be Used to correlate the current outstanding communications network fault with a prior communications network fault;
   (C) retrieving a previously stored set of data regarding a prior communications network fault and a resolution of the prior communications network fault from a database as a function of the at least one identified data field; and
   (D) using at least a portion of the retrieved set of data to provide a resolution of the current outstanding communications network fault by adapting the resolution of the prior communications network fault to resolve the current outstanding communications network fault.

2. The method of claim 1, wherein the previously stored set of data includes fault and resolution data.

3. The method of claim 1, wherein step (B) further comprises the steps of defining the at least one determinator by recording problem solving actions of at least one communications network user using a trouble ticket data structure and using the problem solving actions to define a series of steps that correlate the current outstanding communications network fault to at least one data field in a set of data fields in the trouble ticket data structure.

4. The method of claim 1, wherein step (B) further comprises the step of defining the at least one determinator by determining a set of rules that matches the current outstanding communications network fault to a set of data fields in a trouble ticket data structure.

5. The method of claim 1, wherein step (B) further comprises the step of defining the at least one determinator by applying an information theoretic induction algorithm to a set of trouble tickets stored in a trouble ticket library.

6. The method of claim 5, wherein the step of applying an information theoretic induction algorithm includes applying an ID3 (Iterative Dichotomizing Third) algorithm.

7. The method of claim 1, wherein step (B) further comprises the step of defining the at least one determinator by applying a neural network learning algorithm to a set of trouble tickets stored in a trouble ticket library.

8. The method of claim 7, wherein the step of applying a neural network learning algorithm includes applying a back propagation algorithm.

9. The method of claim 1, wherein step (C) includes the step of using a set of determinators to correlate the current outstanding communications network fault with data fields in a set of data fields of a trouble ticket data structure.

10. The method of claim 1, wherein step (D) further comprises the step of adapting a resolution from at least one retrieved trouble ticket to provide the resolution of a current outstanding trouble ticket.

11. The method of claim 10, wherein the step of adapting includes using a null adaptation technique wherein the resolution of the at least one retrieved trouble ticket is stored in a data field in the current outstanding trouble ticket for storing the resolution.

12. The method of claim 10, wherein the step of adapting includes using a parameterized adaptation technique including the steps of determining a relationship between a data field and the resolution in the at least one retrieved trouble ticket and providing a resolution of the current outstanding trouble ticket using the relationship.

13. The method of claim 10, wherein the step of adapting includes using an abstraction/respecialization technique including the steps of examining the at least one retrieved trouble ticket for a constraint on a resolution stored in the at least one retrieved trouble ticket, determining when the constraint prohibits use of the resolution in the current outstanding trouble ticket, and proceeding to examine another retrieved trouble ticket when the constraint prohibits use of the resolution in the current outstanding trouble ticket.

14. The method of claim 10, wherein the step of adapting includes modifying, by a communications network user, a resolution in a retrieved trouble ticket.

15. The method of claim 10, further comprising the step of proposing a potential resolution prior to providing a resolution of the current outstanding trouble ticket.

16. The method of claim 15, wherein the step of proposing potential resolutions includes the step of displaying potential resolutions to a communications network user.

17. The method of claim 15, wherein the step of proposing a potential resolution includes the step of printing the potential resolution on a printer.

18. The method of claim 15, wherein the step of proposing a potential resolution includes the step of automatically transmitting the proposed resolution to a network configuration module for automatic execution of the proposed resolution.

19. The method of claim 15, further comprising the step of storing the current outstanding trouble ticket in a trouble ticket library after an appropriate resolution has been determined and stored in the data field for storing the resolution.

20. The method of claim 15, further comprising the steps of storing copies of the current outstanding trouble ticket in a trouble ticket library, each copy having a potential resolution stored in the data field for storing the resolution and an indication in another data field of whether the proposed resolution corrected the network fault.

21. An apparatus for resolving faults in a communications network, comprising:
   an input system to acquire information about a current outstanding communications network fault in a form of a current outstanding trouble ticket having at least one data field;
   a fault management system to store prior trouble tickets containing data regarding prior communications network faults and resolutions of those prior communications network faults in a trouble ticket library;
   a fault resolution system to identify at least one data field of the current outstanding trouble ticket, the at least one identified data field to be used to correlate the current outstanding trouble ticket to prior trouble tickets, the fault resolution system to retrieve a set of prior trouble tickets that are similar to the current outstanding trouble ticket using the at least one identified data field, and to provide a resolution of the current outstanding trouble ticket based on resolutions contained in the retrieved set of prior trouble tickets; and
   a system to transmit the resolution of the current outstanding trouble ticket to the communications network.

22. The apparatus of claim 21, wherein the fault resolution system further comprises a system, coupled to an adaptation system, to propose potential resolutions of the current outstanding trouble ticket.

23. The apparatus of claim 22, further comprising a user interface, coupled to the system to propose potential resolutions, to allow a user to edit potential resolutions.

24. A case-based method of resolving faults in a communications network, comprising the steps of:

providing a trouble ticket data structure for describing information concerning a communications network fault;

using the trouble ticket data structure to create a trouble ticket that describes a specific network fault, the trouble ticket having at least one data field for storing information regarding the specific network fault and a data field for storing a resolution of the specific network fault;

providing a prior trouble ticket library for storing at least one prior trouble ticket;

receiving a current outstanding trouble ticket that describes a current outstanding communications network fault;

defining at least one determinator to identify at least one data field of the current outstanding trouble ticket to correlate the current outstanding trouble ticket of the current outstanding communications network fault with at least one data field in a prior trouble ticket in the prior trouble ticket library;

retrieving a set of prior trouble tickets from the prior trouble ticket library that are similar to the current outstanding trouble ticket as a function of the at least one identified data field; and using at least a portion of the resolution from at least one retrieved prior trouble ticket to provide a resolution of the current outstanding trouble ticket.

* * * * *